United States Patent [19]

Bishop

[11] Patent Number: 5,520,414
[45] Date of Patent: May 28, 1996

[54] INFLATABLE RESTRAINT CUSHION

[75] Inventor: Lisa P. Bishop, Oneida, Tenn.

[73] Assignee: Milliken Research Corporation, Spartanburg, S.C.

[21] Appl. No.: 344,102

[22] Filed: Nov. 23, 1994

[51] Int. Cl.$^6$ .................................. B60R 21/16
[52] U.S. Cl. ..................... 280/743.1; 280/728.1
[58] Field of Search .............. 280/743.1, 728.1, 280/732; 383/3

[56] References Cited

U.S. PATENT DOCUMENTS

| | | |
|---|---|---|
| 528,421 | 10/1894 | Estlow . |
| 3,792,873 | 2/1974 | Buchner et al. ............... 280/743.1 |
| 3,807,754 | 4/1974 | Rodenbach et al. ............ 280/743.1 |
| 3,810,654 | 5/1974 | DeBano, Jr. et al. ........... 280/728.1 |
| 4,006,918 | 2/1977 | MacFarland .................... 280/729 |
| 4,010,055 | 3/1977 | Oka et al. ....................... 383/3 |
| 4,944,529 | 7/1990 | Backhaus ....................... 280/743.1 |
| 4,988,118 | 1/1991 | Good et al. .................... 280/743.1 |
| 5,087,071 | 2/1992 | Wallner et al. ................. 280/743.1 |
| 5,090,729 | 2/1992 | Watanabe ....................... 280/743.1 |
| 5,310,216 | 5/1994 | Wehner et al. ................. 280/743.1 |
| 5,316,337 | 5/1994 | Yamaji et al. .................. 280/743.1 |
| 5,423,273 | 6/1995 | Hawthorn et al. .............. 280/743.1 |
| 5,454,594 | 10/1995 | Krickl ............................ 280/743.1 |

FOREIGN PATENT DOCUMENTS

| | | | |
|---|---|---|---|
| 2439222 | 2/1976 | Germany ............. | 280/743.1 |
| 4314347 | 11/1994 | Germany ............. | 280/743.1 |
| 6-239191 | 8/1994 | Japan .................. | 280/743.1 |
| 2263668 | 8/1993 | United Kingdom ... | 280/743.1 |
| 9418033 | 8/1994 | WIPO .................. | 280/743.1 |

Primary Examiner—Eric D. Culbreth
Assistant Examiner—Peter C. English
Attorney, Agent, or Firm—Terry T. Moyer; James M. Robertson

[57] ABSTRACT

An inflatable cushion formed from a polygonal material blank including a central body panel and two foldable side panel structures disposed laterally of the central body panel at one end thereof. The material blank may be folded in loop fashion such that the central body panel edges mate with the edges of the side panel structures thereby permitting the formation of a poly sectional cushion including a mouth or other entrance for introduction of an inflating medium and a body portion for holding the inflating medium.

10 Claims, 2 Drawing Sheets

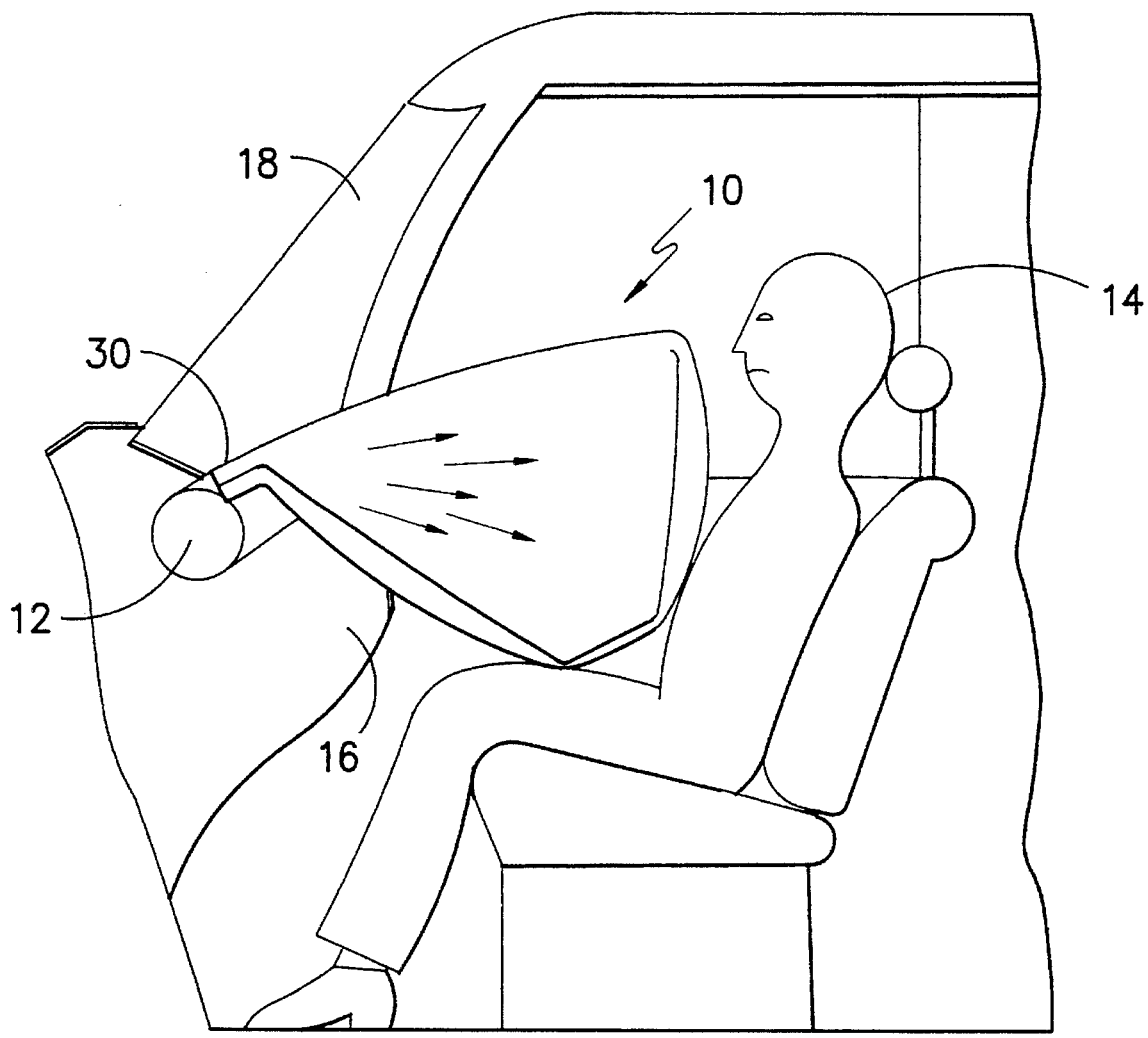
FIG. -1-

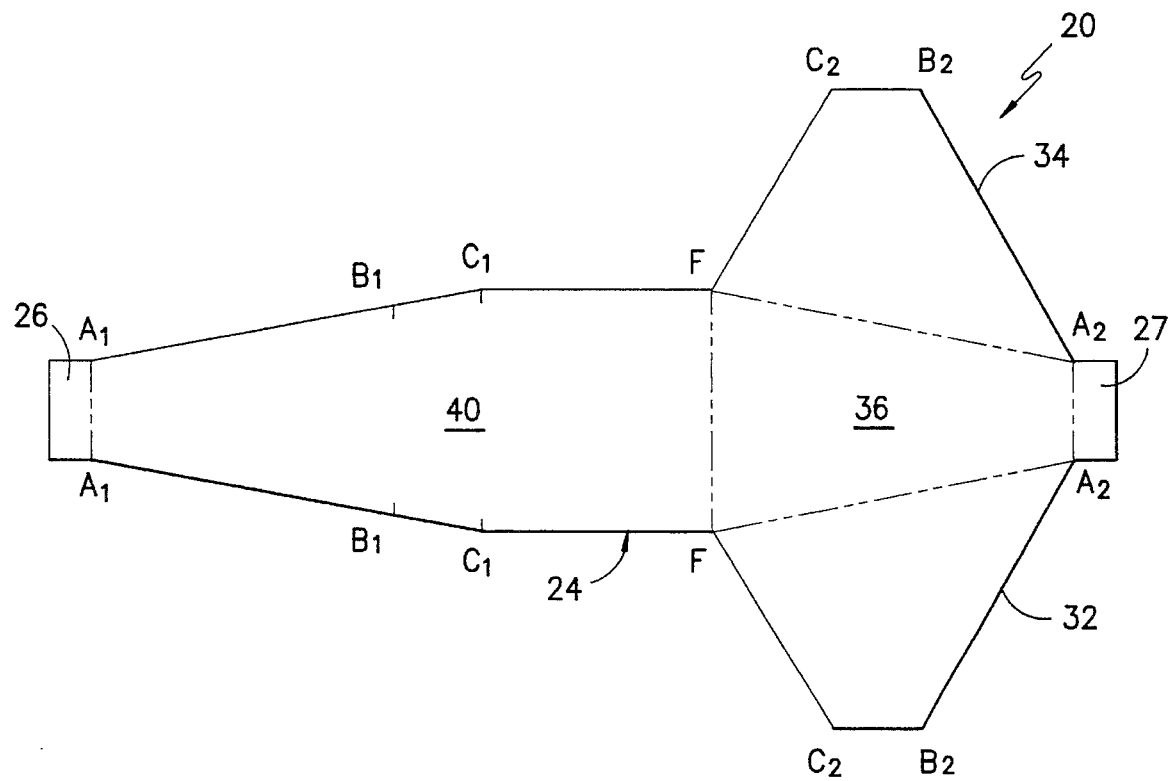
FIG. -2-
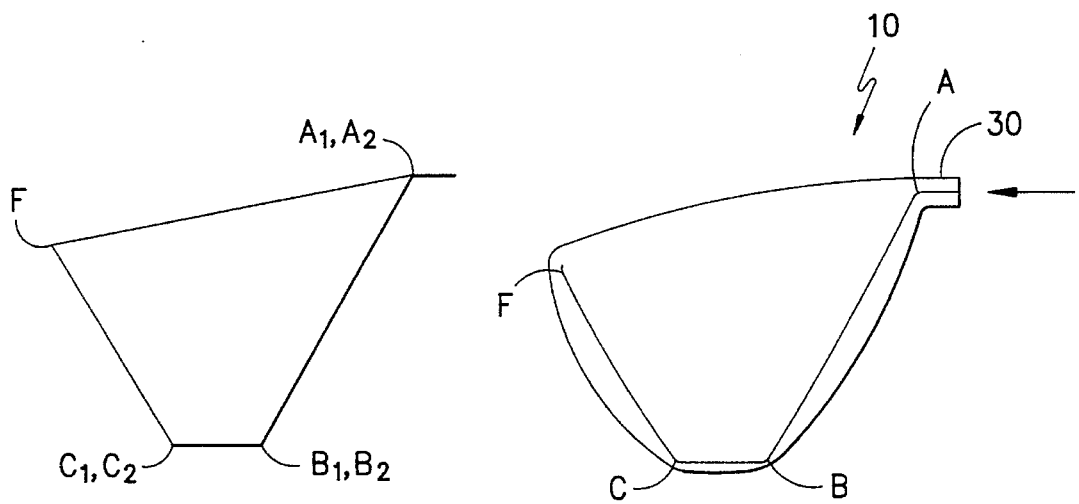
FIG. -3-
FIG. -4-

INFLATABLE RESTRAINT CUSHION

FIELD OF THE INVENTION

The present invention relates generally to vehicle occupant restraint cushions and more particularly to a simplified inflatable cushion for use in opposing or side relation to a vehicle occupant. The inflatable cushion is formed from a polygonal material blank including a central body panel and two foldable side panel structures disposed laterally of the central body panel at one end thereof. The material blank may be folded in loop fashion such that the central body panel edges mate with the edges of the side panel structures thereby permitting the formation of a poly sectional cushion including a mouth or other entrance means for introduction of an inflating medium and a body portion for holding the inflating medium.

BACKGROUND

An inflatable cushion disposed within a supporting structure such as a dash panel, side door or other fixed portion of a car body in opposing relation to a seat in the vehicle plays an important role in protecting the occupants in a vehicle from injury due to collision against the car body. Typically, the inflatable cushion is inflated rapidly by the pressure of a reaction gas released from an inflator during a collision. This gas generation typically takes place when a gas generating agent in the inflator induces a chemical reaction by a collision signal from a collision detecting sensor when the deceleration of the vehicle exceeds a certain level. The gas which is generated by the generator is then conveyed to the inflatable cushion which expands outwardly as it fills with gas to create a protective barrier between the vehicle occupant and the dash panel or other portion of the vehicle body against which the occupant might otherwise be thrown.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column.

Inflatable cushions for use in the protection of passengers against frontal or side impacts must generally have a more complex configuration since the position of a vehicle passenger may not be well defined and greater distance may exists between the passenger and the surface of the vehicle against which that passenger might be thrown in the event of a collision. Some cushions which might be used in such environments are disclosed in U.S. Pat. No. 5,316,337 to Yamaji et al. issued May 31, 1994; U.S. Pat. No. 5,310,216 to Wehner et al. issued on May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

As will be appreciated, a full bodied cushion having a generally hemispherical profile may be desirable so as to provide coverage around a dash panel or door structure. The present invention provides an easily manufactured cushion of substantial depth having such a desired geometry. In order to obtain such configurations in the past, multiple complex sewing steps were necessary to join complex panel structures together. Accordingly, the present invention represents a useful advancement over the present art.

SUMMARY OF THE INVENTION

In view of the foregoing, it is a general object of the present invention to provide an inflatable occupant restraining cushion for use in a vehicle conveying a passenger which can be produced from a single piece of material which can be formed from a small number of folding and sewing steps.

In accordance with the present invention, an inflatable occupant restraint cushion for use in a vehicle conveying at least one passenger is provided. The inflatable restraint cushion includes a mouth portion for receiving an inflating medium and a body portion for holding the inflating medium during operation. Both the mouth portion and the body portion are preferably formed by folding and sewing a single precut blank of material. The blank of material comprises an elongate central body panel having a first section and a second section, wherein the first section of the elongate central body panel is shorter than the second section. The blank of material also includes two side panel structures joined laterally to opposite sides of the first section of the elongate central body portion so as to be offset from the center of the central body panel. The two side panel structures preferably have a generally trapezoidal configuration such that the bases of the trapezoids formed thereby are substantially congruent with the lateral boundaries of the first section of the central body panel. The second section of the central body panel preferably has a generally tapered configuration including boundary edge portions mateable in overlying relation with the boundary edge portions of the adjacent side panel structures. The side panel structures can be folded inward and the central body panel can be folded in loop fashion about a fold line at the intersection between the first and second sections thereof such that the boundary edge portions of the second section of the central body panel may be adjoined to the boundary edges of the adjacent side panel structures so as to form an enclosed container which may be filled with an inflating medium.

BRIEF DESCRIPTION OF THE DRAWINGS

FIG. 1 shows a cut-away view of the inflatable cushion of the present invention in deployment between a passenger and a dash panel.

FIG. 2 shows an elevation view of a material blank from which the inflatable cushion illustrated in FIG. 1 may be formed.

FIG. 3 is an assembly profile of the inflatable cushion formed using the material blank shown in FIG. 2.

FIG. 4 is a profile view of the inflatable cushion formed using the material blank shown in FIG. 2 showing the seam lines therein.

While the invention is illustrated and will be described in connection with a preferred embodiment, it will be understood that it is in no way intended to limit the invention to that embodiment. On the contrary, it is intended to cover all alternatives, modifications and equivalents as may be included within the true spirit and scope of the invention as limited only by the appended claims.

DETAILED DESCRIPTION

Turning now to the drawings, wherein like elements are denoted by like reference numerals in the various views, in FIG. 1 there is shown an inflatable restraint 10 for use with an inflator 12 to protect a vehicle occupant 14 from impacting against a dash panel 16, windshield 18 or other interior surface in the event of a collision. As will be noted, the configuration of the inflatable restraint as illustrated is intended to provide sufficient depth of coverage so as to provide a degree of protection to the vehicle occupant 14 in a number of orientations. In particular, the inflatable restraint is configured to have a generally deep arcuate profile so as to provide good overall coverage.

The inflatable restraint 10 illustrated in FIG. 1 is preferably formed from a single piece precut material blank 20 as illustrated in FIG. 2. In the illustrated and preferred embodiment, the material blank 20 includes an elongate central body portion 24 bounded on either end by extending tab sections 26, 27. These extending tab sections, 26, 27 are used to form the mouth 30 of the inflatable restraint 10 which is mated to the inflator 12 in a manner well known to those of skill in the art.

In the preferred embodiment, the material blank 20 is also provided with two side panel structures 32, 34 which are joined laterally to opposite sides of a first body panel section 36 of the central body portion 24. As illustrated, this first body panel section 36 preferably extends from a fold-line F—F to the line of origin $A_2$–$A_2$ of extending tab section 27. In the illustrated and potentially preferred embodiment, the central body portion 24 further includes a second body panel section 40 extending between fold line F—F and $A_1$–$A_1$. The second body panel section 40 is proximate to and in connecting relation with the first body panel section 36.

As shown, the side panel structures 32, 34 are joined laterally to the opposite sides of the first body panel section 36 of the central body portion 24. Moreover, in the preferred embodiment the side panel structures 32, 34 are of a generally trapezoidal configuration such that the base of the trapezoids formed thereby are substantially congruent with the lateral boundaries of the first body panel section 36 of the central body portion. While the four-sided trapezoidal configuration for the side panel structures 32, 24 may be preferred, in some instances it may be desirable to use a configuration having a different number of edge portions. By way of example only, side panels having up to about eight edge portions may be particularly useful in obtaining desired geometries. Further, in some instances it may be desirable to use side panel structures having substantially rounded profiles including semi-circular, semi-elliptical, or substantially parabolic profiles.

As illustrated, the boundary segments of the second body panel section 40 of the central body portion and the side panel structures 32, 34 preferably correspond to one another so as to provide a substantially over lying mating relationship when the first and second body panel sections of the central body portion are folded inward towards one another along fold line F—F. Specifically, it is preferred that the line segment $C_1$–F be substantially equivalent to the length of line segment $C_2$–F, line segment $C_1$–$B_1$ is substantially equivalent to $C_2$–$B_2$ and line segment $A_1$–$B_1$ is substantially equivalent to line segment $A_2$–$B_2$.

A profile of the resulting folded fabric structure formed when material blank 20 is folded along fold line F—F and the corresponding line segments are joined by sewing or other adhesive means is illustrated in FIG. 3. While this profile only illustrates the fold lines and points of contact on one side of the inflatable restraint 10, it is to be understood that in the preferred practice both sides of the inflatable restraint will be substantially symmetrical, although it is contemplated that some asymmetry may be designed into the inflatable restraint 10 if desired to obtain a particular final expanded configuration.

In FIG. 4 the inflatable restraint 10 is illustrated in expanded configuration showing the seam lines across one side thereof. As will be appreciated, the formation of the inflatable restraint 10 requires only minimal sewing along a small number of relatively straight seam lines F–C, C–B, and B–A, on either side of the folded material blank 20 to effect substantial closure of the inflatable restraint 10 except for the desired opening at the mouth 30 formed at the intersection of extending tab sections 26, 27 which may be attached to the inflator 12 as desired.

It will be appreciated that the material blank 20 may be formed from any suitable woven or extruded material for use in an inflatable restraint environment so long as the material is sufficiently flexible to permit the requisite folding and mating of corresponding boundary segments as illustrated and described above. Potentially preferred materials may include woven or nonwoven fabric constructions of nylon, polyester, or other suitable natural or polymeric materials as are well known to those of skill in the art. Fabrics formed from nylon 6, 6 may be particularly preferred.

It is, of course, to be understood that while particular embodiments of the inflatable restraint and material blank 20 have been illustrated and described, it is contemplated that multiple other embodiments may also be utilized. By way of example only and not limitation, the second body panel section 40 of the central body portion could be substantially straight rather than being tapered from the fold line F—F to the terminus $A_1$–$A_1$ as illustrated in FIG. 2. Should such a straight configuration be utilized, folding would occur substantially in the same manner as described in relation to the potentially preferred embodiment, however, a slight trimming operation may be desired following formation of the seams along the folded edges of the material blank. Moreover, while it is preferred to use a single precut material blank 20 in formation of the inflatable restraint, it is likewise contemplated that the various segments which make up the material blank could be formed separately and joined together prior to the folding and seaming operations previously described.

Thus, while specific embodiments of the invention have been shown and described, it is to be understood that the invention is not limited thereto, since modifications may certainly be made and other embodiments of the principals of this invention will no doubt occur to those skilled in the art to which this invention pertains. Therefore, it is contemplated by the appended claims to cover any such modifications and other embodiments as incorporate the features of this invention within the true spirit and scope of the following claims.

What is claimed is:

1. In an inflatable restraint cushion formed from a blank of material for use in conjunction with an inflation device for the protection of a vehicle occupant in the event of a collision, the blank of material comprising:

an elongated central body portion having a first body panel section and a second body panel section, the first body panel section and the second body panel section being in proximal relation to one another along an intersecting fold line, the first body panel section being shorter than the second body panel section, said first and second body panel sections being free of any mouth opening for the introduction of inflation gases into said restraint cushion; and two side panel structures joined to opposite lateral sides of the elongated central body portion such that the two side panel structures are disposed in opposing relation to one another along the first body panel section of the central body portion offset from the center of the central body portion, such that the blank of material may be folded in loop fashion about the intersecting fold line between the first and second body panel sections with the boundary edges of the second body panel section being adjoined to the boundary edges of adjacent side panel structures so as to form a structure having an open mouth formed between terminal ends of the elongated central body portion through which an inflation medium may be introduced.

2. The invention as in claim 1, wherein the two side panel structures are polygonal having a base and a plurality of substantially straight boundary edges.

3. The invention as in claim 2, wherein the two side panel structures have generally trapezoidal configurations.

4. The invention as in claim 3, wherein the bases of the two side panel structures are substantially congruent with the lateral boundaries of the first body panel section of the central body portion.

5. The invention as in claim 4, wherein the two side panel structures have a base and three substantially straight boundary edges.

6. The invention as in claim 3, wherein the second body panel section has a generally tapered configuration, the boundary edge of the second body panel section including edge portions which are matable in overlying relation with the boundary edges of adjacent side panel structures.

7. The invention as in claim 6, wherein the two side panel structures have a base and three substantially straight boundary edges.

8. The invention as in claim 3, wherein the two side panel structures have a base and three substantially straight boundary edges.

9. The invention as in claim 1, wherein the two side panel structures have a substantially rounded profile and a linear base.

10. In an inflatable restraint cushion formed from a blank of material for use in conjunction with an inflation device for the protection of a vehicle occupant in the event of a collision, the blank of material comprising:

an elongated central body portion having a first body panel section and a second body panel section, the first body panel section and the second body panel section being in proximal relation to one another along an intersecting fold line, the first body panel section being shorter than the second body panel section, said first and second body panel sections being free of any mouth openings for the introduction of inflation gases into said restraint cushion; and two side panel structures joined laterally to opposite sides of the elongated central body portion such that the two side panel structures are disposed in opposing relation to one another along the first body panel section offset from the center of the central body portion, the two side panel structures having a generally trapezoidal configuration wherein the bases of the side panel structures are substantially congruent with and extend along the lateral boundaries of the first body panel section of the central body portion, the second body panel section of the central body portion having a generally tapered configuration including boundary edge portions mateable in overlying relation with the boundary edge portions of the side panel structures such that the blank of material can be folded in loop fashion about the intersecting fold line between the first body panel section and the second body panel section with the boundary edge portions of the second body panel section being adjoined to the boundary edge portions of adjacent side panel structures by at least two separate seams so as to form a structure having an open mouth formed between terminal ends of the elongated central body portion through which an inflation medium may be introduced.

* * * * *